G. C. HOWARD.
PROCESS FOR RECOVERING SULPHUR DIOXIDE FROM WASTE METALLURGICAL GASES.
APPLICATION FILED MAR. 6, 1919.
1,417,067.
Patented May 23, 1922.
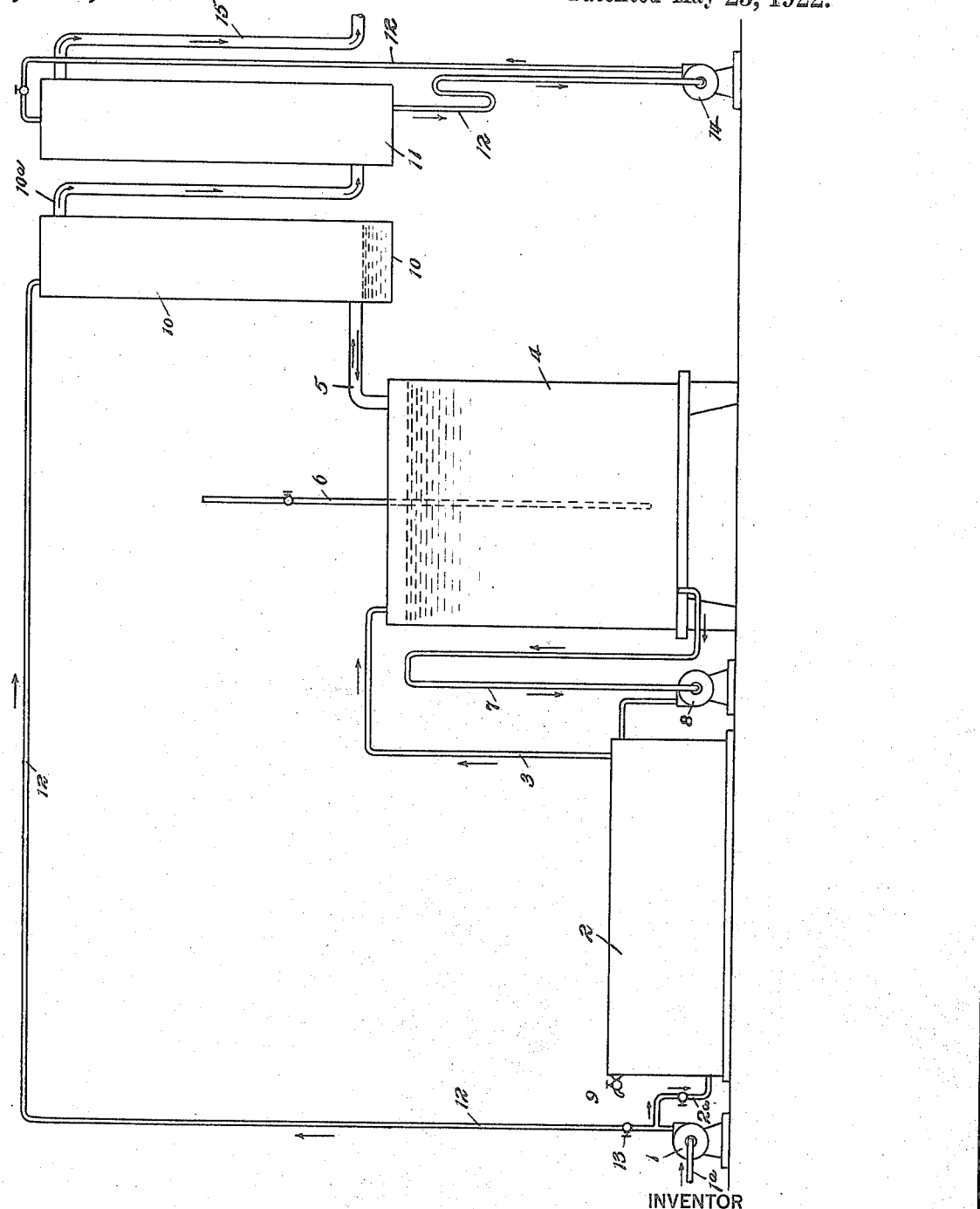
INVENTOR
Guy C. Howard
BY
ATTORNEY

UNITED STATES PATENT OFFICE.

GUY C. HOWARD, OF TACOMA, WASHINGTON, ASSIGNOR TO AMERICAN SMELTING & REFINING CO., A CORPORATION OF NEW JERSEY.

PROCESS FOR RECOVERING SULPHUR DIOXIDE FROM WASTE METALLURGICAL GASES.

1,417,067.  Specification of Letters Patent.  Patented May 23, 1922.

Application filed March 6, 1919. Serial No. 281,010.

*To all whom it may concern:*

Be it known that I, GUY C. HOWARD, a citizen of the United States, and resident of Tacoma, in the county of Pierce and State of Washington, have invented certain new and useful Improvements in Processes for Recovering Sulphur Dioxide from Waste Metallurgical Gases, of which the following is a specification.

My invention relates broadly to the economical recovery of sulphur dioxide from gases produced in metallurgical operations, and relates particularly to the economical recovery of this product from gases which contain a low percentage of sulphur dioxide.

It is well known that the amount of water necessary to absorb sulphur dioxide from a gas mixture depends on the percentage of the sulphur dioxide in such mixture and essentially follows the so-called "partial pressure" law of gases. Consequently more water per pound of sulphur dioxide absorbed is required in the treatment of a weak gas mixture than in the treatment of a relatively strong mixture. The use of this larger quantity of water not only involves expense for the actual mechanical handling of the water, but involves a much greater expense for heating the same to extract the sulphur dioxide therefrom.

Heretofore the process of making sulphur dioxide from metallurgical gases broadly considered has comprised the steps of—(*a*) absorbing the sulphur dioxide constituent in cold water; (*b*) heating this water solution to the boiling point to drive off the contained sulphur dioxide gases; (*c*) drying the gas so driven off; (*d*) liquefying this dry gas by pressure and refrigeration.

The primary object of my invention is to provide an improved method for heating the water solution and for drying the gas and thereby to effect marked economy in the process heretofore employed which will permit low grade gases having a small percentage of sulphur dioxide to be utilized.

Another object of my invention is to utilize the sulphur dioxide liquor direct from the absorption vat or tower, as a means of cooling the heated gas before it goes to the drying tower.

Still another object of my invention is to preheat all of the liquor to a temperature as high as possible before it enters the boiling vat so that the quantity of steam required to boil the liquor in this vat will be reduced to a minimum.

A further object of the invention is to avoid the handling of any water that does not pass through the absorption tower and which does not contain sulphur dioxide, whereby the use of fresh water for cooling or any other purpose is eliminated.

Still a further object of the invention is to extract as much of the heat as possible, not only from the waste water from which the sulphur dioxide has been extracted by boiling, but also to extract the heat which is contained in the sulphur dioxide gas and in the moisture carried over by said gas from the boiling vat.

The invention also consists in the various other novel steps of my process hereinafter set forth and claimed and in the new and novel features of construction of the apparatus hereinafter disclosed.

In the accompanying drawing the figure is a diagrammatic view of one form of apparatus adapted for carrying out my process.

The saturated liquor from any suitable absorption tower (not shown) is supplied to the pump 1 through a pipe 1ª. From this pump the main portion of the liquor passes through a valve controlled pipe 2ª to a heat interchanger 2 where the incoming liquor is heated almost to the boiling point by the spent water from a subsequent step in the process. From the tank 2 the heated liquor passes through pipe 3 to boiling tank or vat 4. This tank is heated by any suitable means as the steam pipe 6 whereby the liquor contained therein may be raised to the boiling point and the absorbed sulphur dioxide gas driven off. The waste water from tank 4 is returned via pipe line 7 communicating with pump 8 to the heat interchanger 2 and after its heat has been exhausted is discharged through waste cock 9. The gas from the boiling tank passes through a pipe 5 to a cooling tower 10 that is gas tight and is provided with a suitable filler, such as coke or tile. An outlet pipe 10ª near the top of this tower communicates with the bottom of the scrubbing tower 11 containing a suitable filler where the gas is subjected to the action of sulphuric acid. Circulation of the acid through the tower is provided by the pipe line 12 communicating with the pump 14. The gas exits from the tower 11 through a pipe 15 and passes to a compresser (not shown) in which the dry sulphur dioxide gas is compressed and liquefied in subsequent cooling coils in the usual and well known manner.

A portion of the cold strong liquid, however, does not pass through the heat interchanger 2, but is driven by the pump 1 through a pipe 12 controlled by suitable means and the valve 13 directly to the top of the cooling tower 10. It circulates over and through the filler contained in this tower, cooling the hot gases as it passes and in turn absorbing heat therefrom and then passes to the boiling tank 4 through the pipe 5 which is preferably of sufficient size to allow easy passage of the gas and of the liquor in the same pipe.

In operation the cold liquor from the absorption tower which is more or less saturated with sulphur dioxide passes in two streams, the one and larger stream going through the heat interchanger where it absorbs the heat from the heated waste water, and the other and smaller stream passing directly to the cooling tower 10. The pump 1 forces the main stream of liquor through the heat interchanger into the boiling tank 4. The waste water from the boiling tank from which the sulphur dioxide has been driven off, is removed from the boiling tank by the goose-neck pipe 7 through pump 8 to the interchanger 2, where this waste water imparts its heat to the incoming cold liquor which thus has its temperature raised almost to the boiling point. The other and smaller portion of the liquor from the absorption tank (not shown) is delivered to cooling tank 10, percolates over and through the filler and after being heated reaches the boiling tank 4 through the pipe 5. The quantity of liquor delivered to the cooling tower is regulated so that the heat absorbed from the hot gas and the moisture that is carried over with the gas into the cooling tower will raise its temperature preferably almost to the boiling point before it enters the boiling tank. The cooled gas leaves the tank 10 at a materially reduced temperature, for example, approximately 60° F. and although it still carries moisture, the total moisture is very small because the carrying capacity of the gas at this temperature is relatively slight.

By means of this process it is not necessary to use any fresh water but the saturated liquor itself serves the purpose of cooling the hot gases from the boiling tank. All of the liquor which enters the system carries more or less sulphur dioxide in solution and it is all heated to a relatively high temperature before it enters the boiling vat. Consequently, a relatively small amount of steam is used to maintain the liquor in the boiling vat at the necessary temperature of 212° F. required to drive off the contained sulphur dioxide in the form of a gas. The heat supplied to the boiling vat is recovered in whole or in part from the waste water which goes to the heat interchanger or is absorbed from the gas and moisture which is carried over into the cooling tank. Therefore, a minimum amount of steam is required for heating purposes. The cost of pumping is also reduced to a minimum since no fresh water is used in the system. As a result the cost of recovering the sulphur dioxide is reduced until it is commercially practicable to treat metallurgical gases containing a relatively low percentage of the product and to produce liquid sulphur dioxide in competition with other products such as brimstone.

While I have shown and described and have pointed out in the annexed claims, certain novel features of my invention, it will be understood that various omissions, substitutions and changes in the several steps of my process and in its operation and in the form and details of the apparatus illustrated may be made by those skilled in the art without departing from the spirit of the invention.

Having described my invention, what I claim is:

1. In the art of recovering sulphur dioxide from gases, the process which consists in passing a solution containing sulphur dioxide counter current through a mixture of sulphur dioxide gas and water vapor and then removing the sulphur dioxide from said solution.

2. The process of recovering sulphur dioxide from metallurgical gases which consists in passing cold sulphur dioxide solution through a mixture of sulphur dioxide gas and water vapor, then heating said solution to the boiling point and removing the sulphur dioxide therefrom.

3. In the art of recovering sulphur dioxide, the process which consists in passing cold sulphur dioxide solution in regulated quantities and counter current direction through a mixture of hot sulphur dioxide gas and water vapor, heating said solution approximately to the boiling point, and then removing the sulphur dioxide from said solution.

4. The process of recovering sulphur dioxide from metallurgical gases which consists in heating a solution containing sulphur dioxide to remove moisture laden sulphur dioxide gas therefrom, passing a liquid containing sulphur dioxide counter current through said moisture laden gas to heat said liquid and to cool said gas and then liquefying said gas.

5. The process of recovering sulphur dioxide from metallurgical gases which consists in heating a body of sulphur dioxide liquor to approximately the boiling point to distill moisture laden sulphur dioxide gas therefrom, passing cold sulphur dioxide solution through said gas to heat said solution and to cool the gas, and then delivering said heated solution to the body of boiling liquor.

6. The process which consists in heating a sulphur dioxide liquor in a boiling vat, heating another portion of said liquor by passing the same counter current through the hot moisture laden sulphur dioxide gas given off from the boiling vat and delivering said portion of liquor to the boiling vat while maintaining the liquor in the vat at approximately its boiling point.

7. The process which consists in heating a portion of a solution containing sulphur dioxide to approximately its boiling point by hot waste liquor from a boiling vat, heating another portion of said liquor to approximately its boiling point by passing the same counter current through the hot moisture laden sulphur dioxide gas given off by the boiling vat, bringing said portions together in the boiling vat and maintaining the liquor in the vat at substantially its boiling point.

8. The process of recovering sulphur dioxide from metallurgical gases which consists in heating a solution containing sulphur dioxide with the waste liquid from which sulphur dioxide gas has been removed, raising the temperature of the solution in a boiling vat to remove the sulphur dioxide therefrom, causing a cold solution containing sulphur dioxide to pass through said heated gas to cool the same whereby the said solution is heated, and then delivering said solution to the boiling vat.

9. The process of recovering sulphur dioxide which consists in preheating a solution containing sulphur dioxide with the waste liquor from which sulphur dioxide gas has been removed, raising the temperature of the preheated solution to highly heat the same thereby to remove the sulphur dioxide therefrom, subjecting a cold solution containing sulphur dioxide to a heat treatment and then adding the solution thus heated to the highly heated solution.

10. In the art of recovering sulphur dioxide from a liquid containing the same, the process which consists in dividing the liquid into two portions, preheating one portion of the liquid and then finally heating the same to drive off hot sulphur dioxide gas and to form a hot residue liquid, utilizing the hot gas to liberate the gas from the other portion and to provide additional hot residue liquid and utilizing both of the hot liquids to supply the heat necessary to effect the preheating of a succeeding portion of the sulphur dioxide liquid.

11. In the art of recovering sulphur dioxide from a liquid containing the same, the process which consists in dividing the liquid into two streams, subjecting the liquid in one of the streams when at a sub-boiling temperature to a heat treatment sufficient to raise the temperature and thus effect a more rapid liberation of the sulphur dioxide, and to form a heating liquid, subjecting the other stream to a heat treatment to liberate sulphur dioxide therefrom and to add to the heating liquids and causing the heating liquid to pre-heat the sulphur dioxide liquid in the first named stream to raise the temperature thereof to said sub-boiling temperature.

12. In the art of recovering sulphur dioxide from a relatively cold liquid containing the same and while under a pressure sufficient to maintain a flow line, the process which consists in successively subjecting the liquid to a two-stage heat treatment, first to raise the temperature to a relatively high temperature but slightly below the temperature at which the sulphur dioxide is liberated at atmosphere pressure and then, during the second stage, to a temperature to effect said liberation, introducing a heat vehicle having a high temperature to the liquid during said second stage, the amount of heat introduced being largely in excess of the amount necessary to liberate the sulphur dioxide present and causing the liquid thus highly heated by the excess heat to react on the cold liquid during the first stage to raise the temperature of the same to said relatively high but sub-boiling temperature.

13. In the art of recovering sulphur dioxide gas from a solution thereof, the process which consists in dividing the solution into two portions, preheating one of said portions to approximately its boiling point by hot waste liquid from a succeeding boiling step, preheating the other portion to approximately its boiling point by means of the hot sulphur dioxide gas given off by the succeeding boiling step, assembling said two preheated portions and heating the assembled portions to a boiling temperature thereby to liberate therefrom the hot sulphur dioxide gas to heat the said other portion.

14. In the art of recovering sulphur dioxide gas from a solution thereof, the process which consists in dividing the solution into two portions, preheating one of said portions to approximately its boiling point by utilizing all of the hot waste liquid from a succeeding boiling step, preheating the other portion to approximately its boiling point by means of the hot sulphur dioxide gas given off by the succeeding boiling step, assembling said two preheated portions and treating the assembled portions to the action of a heating medium having a liquid heating capacity sufficient to raise the portions from their preheated temperatures to their boiling temperature thereby to liberate therefrom the hot sulphur dioxide.

Signed at Tacoma, in the county of Pierce, and State of Washington, this 17th day of Febr., 1919 A. D.

GUY C. HOWARD.